United States Patent Office 3,447,486
Patented June 3, 1969

3,447,486
PELLET MACHINE DIE
Maurice Wooding and Albert Erich Dreibholz, Jr., Crescent, Eaton, Norwich, Norfolk, England, assignors to Dreibholz & Company Limited, Dereham, Norfolk, England, a British company
Filed Dec. 7, 1966, Ser. No. 599,930
Claims priority, application Great Britain, Dec. 14, 1965, 53,028/65
Int. Cl. A21c *11/16*
U.S. Cl. 107—14      3 Claims

ABSTRACT OF THE DISCLOSURE

A die for use in a process of manufacturing pellets of material includes a cylindrical die ring formed from loaded polytetrafluoroethylene so that, as the material is being made into pellets in apertures in the die ring, the material is in contact with surfaces to the aperture which are essentially polytetrafluoroethylene surfaces and which have a very low co-efficient of friction. Consequently the pellets which are formed have a smooth and shiny surface which is known to be a desirable feature, and also the power necessary to drive the die is considerably reduced as compared with conventional dies.

---

Figure 1:
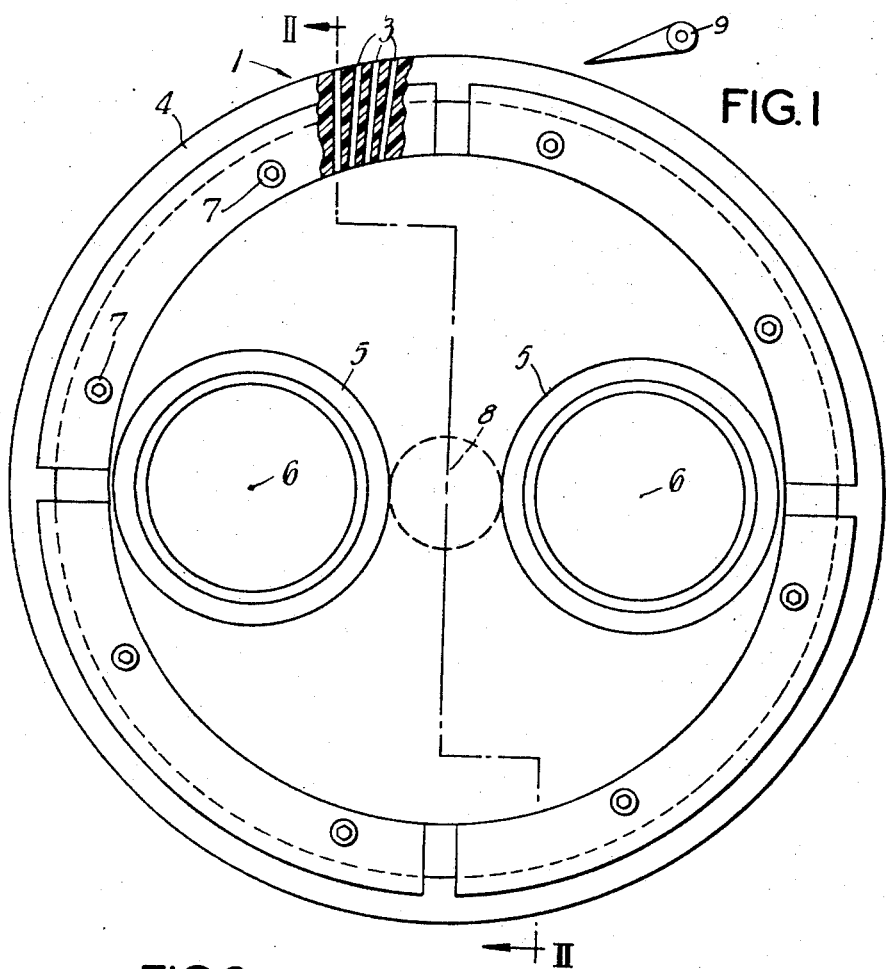

This invention relates to apparatus for manufacturing pellets of material, and particularly to a die for use in such apparatus, the die being conventionally known as a pellet machine die.

The apparatus is used particularly for pelleting material for animal feed stuffs or for pelleting sugar pulp, and in either of these industries it is found that the working life of the die is equal to the passage of about 1,500 tons of the material. The rate at which the material is passed through the die may be anything up to seven tons per hour, so that the life of the die is limited.

It is the force which is built up around the apertures in the die which induces wear at this parts, and once the die has become substantially worn it is useless. In the conventional apparatus the whole die has to be replaced with consequent loss of valuable manufacturing time as well as the expense of the replacement die.

It is a main object of the present invention to provide a pellet machine die which will have a substantially increased life as compared with the conventional die at present used in apparatus for manufacturing pellets of material.

The present applicants have made the surprising discovery that polytetrafluoroethylene, although soft and apparently useless as a replacement for hardened steels, may in fact be used as a primary constituent of a pellet machine die by reason of the low co-efficient of friction which the polytetrafluoroethylene exhibits and which results in the degree of wear of the die being low as compared with the wear which occurs with a hardened steel die.

In accordance with the present invention there is provided a die for use in manufacturing pellets of material, the die ring which contains the pellet-forming apertures comprising polytetrafluoroethylene.

The present applicants have further found that the properties of the die ring in accordance with the invention are improved by using polytetrafluoroethylene loaded with metallic material in powdered or granular form.

In accordance with another feature of the present invention the applicants propose that the die should be made from a die ring of polytetrafluoroethylene mounted between metallic flanges. In accordance with a particular aspect, therefore, the present invention provides a die for use in manufacturing pellets of material comprising a die ring containing pellet-forming apertures, the rie ring being mounted between metallic flanges, and the die ring consisting of polytetrafluoroethylene loaded with metallic powder or granules.

All the most advantageous aspects of the present invention are manifested when the die ring containing the pellet-forming apertures is made from polytetrafluoroethylene loaded with stainless steel, and in accordance with a particular embodiment of the invention the material of the die ring comprises by weight 60% polytetrafluoroethylene and 40% stainless steel.

The present invention also comprehends apparatus for manufacturing pellets of material comprising a die in accordance with the invention, and rotatable rollers for urging material through the pellet-forming apertures, the rollers being formed of polytetrafluoroethylene loaded with stainless steel.

Figure 3:
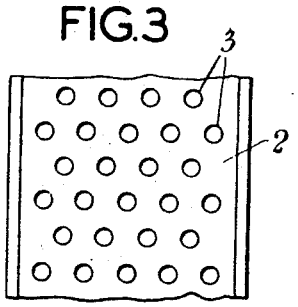
Figure 2:
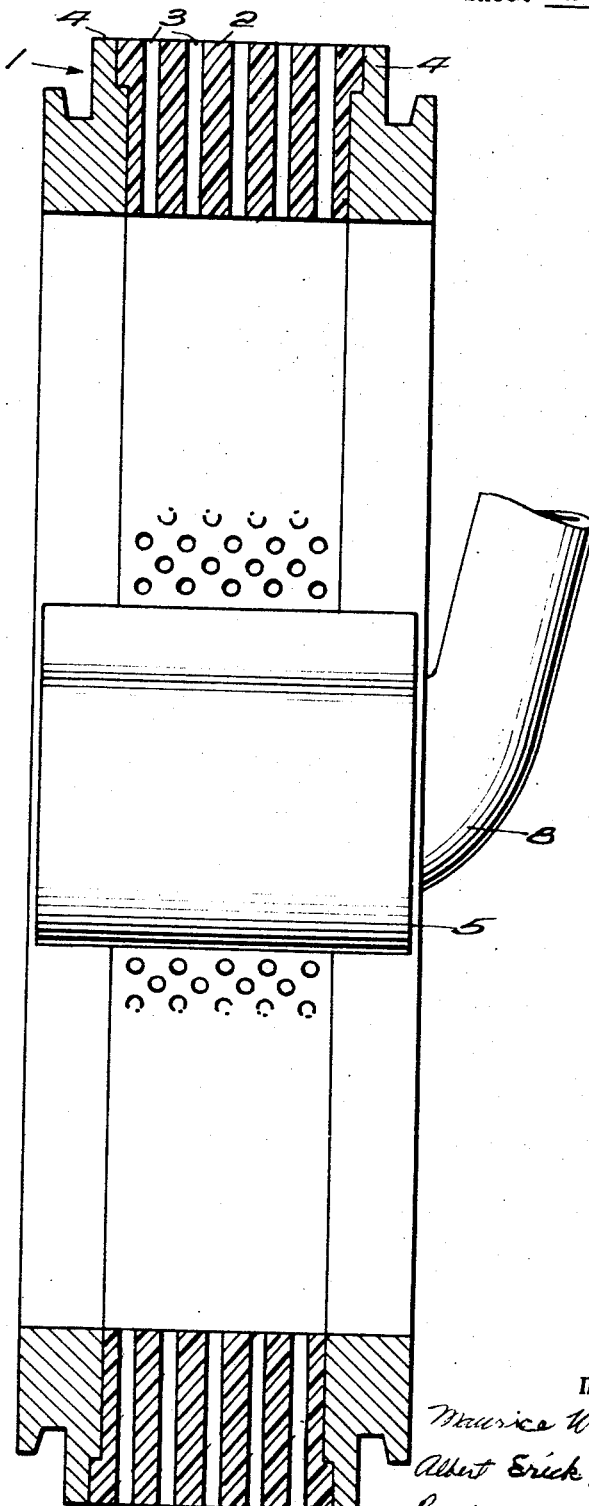

In order that the present invention may be better understood a preferred embodiment will be described, by way of example, with reference to the accompanying drawings in which:

FIGURE 1 shows in part section apparatus for manufacturing pellets of material comprising a die ring in accordance with the present invention, FIGURE 2 is an enlarged section of the die of FIGURE 1 taken along the line II—II, and FIGURE 3 is a fragmental view of the outside of the die ring of FIGURES 1 and 2.

In the drawings the same or similar parts are designated by like reference numerals.

Referring to the drawings, the apparatus for manufacturing pellets of material comprises a die indicated generally by the reference numeral 1. The die 1 consists of a die ring 2 containing pellet-forming apertures 3 mounted between metallic flanges 4 of steel by screws 7. The die ring 2 is made in accordance with the present invention of a material comprising by weight 60% polytetrafluoroethylene and 40% stainless steel.

The apparatus for manufacturing pellets further comprises rollers 5 mounted to be rotatable about their longitudinal axes 6. A clearance between the surfaces of the rollers 5 and the inner circumference of the die ring 2 is provided, and as the material to be formed into pellets is fed axially at 8 into the apparatus this material engages between the driven die and the rollers 5, with the result that the rollers 5 are rotated and the material is forced through the pellet-forming apertures 3. Suitable lengths of pellet are obtained by the action of a knife 9 located immediately beyond the outer circumference of the die ring 2.

The rollers 5 may be of hardened steel, but preferably the rollers 5 are also made of material comprising by weight 60% polytetrafluoroethylene and 40% stainless steel. The advantage of this arrangement is a reduction in the number of bearings and the avoidance of many grease points in the apparatus.

Although a particular composition of material containing 60% by weight of polytetrafluoroethylene and the balance of stainless steel has been described, different proportions by weight of these materials may be used. It is found that improved results as compared with conventional dies of hardened steel are obtained using a material containing from 10% to 90% of stainless steel granules, and best results are obtained using a material containing from 10% to 60% of stainless steel, the balance in each case being polytetrafluoroethylene.

The working life of the die substantially as described is increased as compared with the life of the conventional die of hardened steel which was used previously. The apparatus is therefore more economical in cost. It is also substantially lighter than the previously used apparatus and requires less horsepower to drive it, owing to the low friction co-efficient of polytetrafluoroethylene.

We claim:
1. Apparatus for use in a process of manufactuing pellets of material by conpacting the material under pressure without application of heat and by forcing the compacted material through pellet-forming apertures, the apparatus comprising
   a cylindrical die adapted to be driven for rotation about the axis of the cylinder,
   the cylindrical die including a cylindrical die ring which comprises an annular body in which pellet-forming apertures are present between the inner and outer circumferences of the annular body,
   the annular body comprising from 40% to 90% by weight of polytetrafluoroethylene and from 10% to 60% by weight of a compatible strengthening material in powdered form;
   rollers mounted for rotating within the cylindrical die about axes parallel to the axis of the cylinder;
   means for feeding the material to be pelleted axially into the cylindrical die for engagement between the driven cylindrical die and the rollers, whereby the material is compacted and forced through the pellet-forming apertures in the annular body by the rollers; and
   knife means located immediately beyond the outer circumference of the annular body for cutting the pelleted material into desired lengths of pellet.

2. Apparatus according to claim 1, wherein the compatible strengthening material is stainless steel granules.

3. Apparatus according to claim 1, wherein the annular body comprises by weight 60% of polytetrafluoroethylene and 40% of stainless steel.

References Cited

UNITED STATES PATENTS

| | | | |
|---|---|---|---|
| 2,400,091 | 5/1946 | Alfthan. | |
| 2,400,099 | 5/1946 | Brubaker. | |
| 2,403,476 | 7/1946 | Berry et al. | |
| 2,586,089 | 2/1952 | Rhodes | 107—12 |
| 2,824,060 | 2/1958 | White | 252—12 XR |
| 2,956,848 | 10/1960 | St. Clair | 252—12 XR |
| 2,971,908 | 2/1961 | Chaffin | 252—12 |
| 3,191,227 | 6/1965 | Keefe | 18—12 |
| 3,117,343 | 1/1964 | Soars | 18—12 |

FOREIGN PATENTS 837,198   6/1960   Great Britain.

BILLY J. WILHITE, *Primary Examiner.*

U.S. Cl. X.R.

18—12; 252—12